Feb. 4, 1941. W. W. DAVIDSON Re. 21,707

MACHINE FOR SEPARATING AND FEEDING BLANKS

Original Filed June 18, 1931 3 Sheets-Sheet 1

Feb. 4, 1941. W. W. DAVIDSON Re. 21,707

MACHINE FOR SEPARATING AND FEEDING BLANKS

Original Filed June 18, 1931 3 Sheets-Sheet 2

Inventor:
William Ward Davidson
By Geo. E. Wolff Atty.

Feb. 4, 1941. W. W. DAVIDSON Re. 21,707
MACHINE FOR SEPARATING AND FEEDING BLANKS
Original Filed June 18, 1931 3 Sheets-Sheet 3
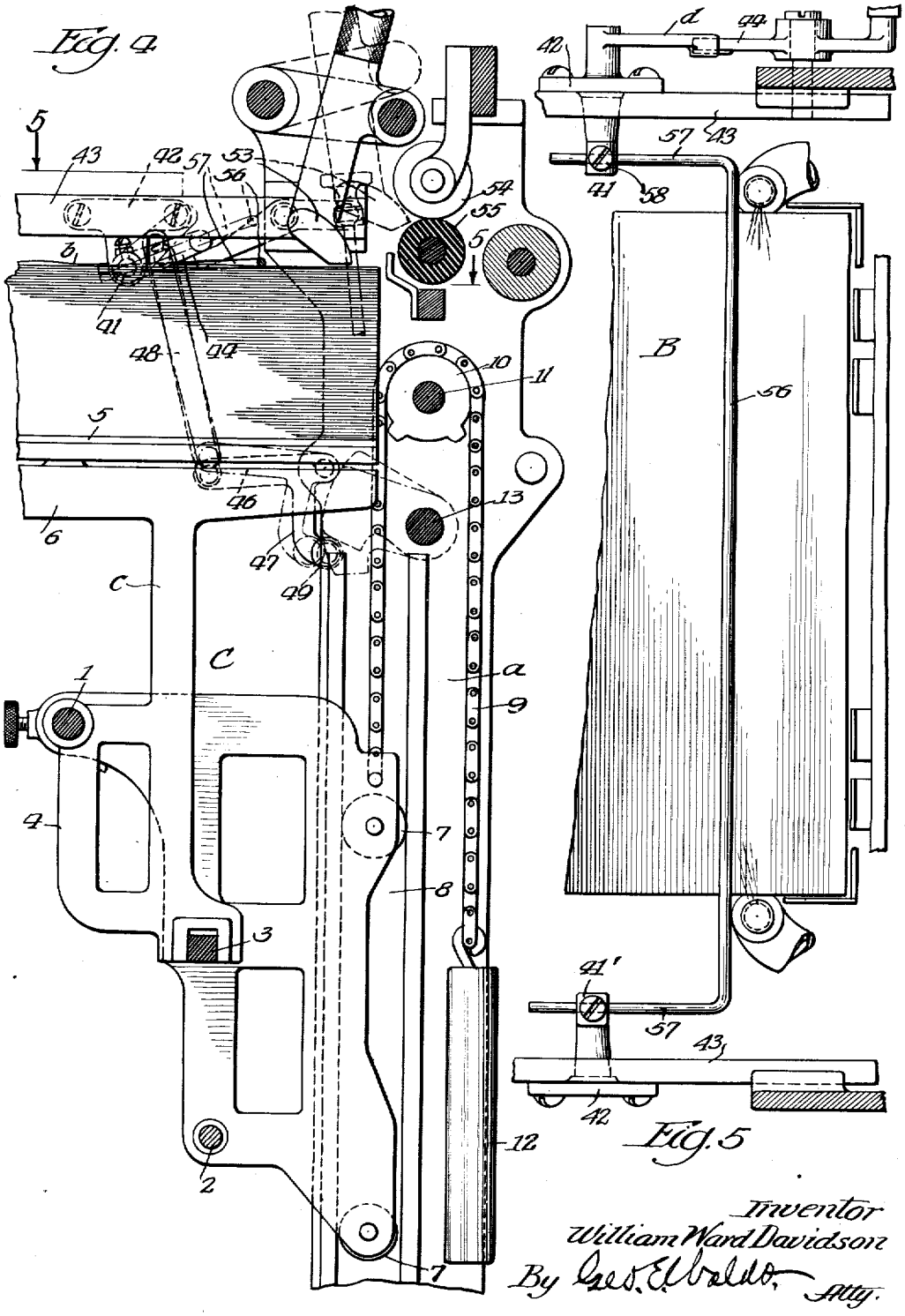
Inventor
William Ward Davidson
By Geo. E. Wolcott Atty.

Reissued Feb. 4, 1941

Re. 21,707

UNITED STATES PATENT OFFICE 21,707

MACHINE FOR SEPARATING AND FEEDING BLANKS

William Ward Davidson, Evanston, Ill.

Original No. 1,963,694, dated June 19, 1934, Serial No. 545,214, June 18, 1931. Application for reissue July 1, 1939, Serial No. 282,499

20 Claims. (Cl. 271—62)

This invention relates to machines for separating and feeding blanks of the general type comprising a vertically movable pack carriage, blank separating means adapted for withdrawing blanks from the top of a pack supported on said carriage, means for raising and lowering said pack carriage including power means for raising the same, and means for rendering said power raising means inactive when the top of the pack attains a predetermined level relative to the blank separating means.

As shown, the pack carriage raising and lowering mechanism of the present application is substantially a reproduction of detail of the means fully shown in United States Letters Patent No. 1,613,984, dated January 11, 1927.

The machine of said prior Patent No. 1,613,984, however, comprises a vertically movable separator unit, and in accordance with the disclosure of said patent, the means for rendering the power means for raising said pack carriage inactive, is controlled directly by vertical movement of said separator unit.

The machine of the present application, however, has no part or element corresponding to the vertically movable separator unit of said prior patent, and the object of the present invention is to provide an improved means, such as shown in United States Letters Patent No. 1,627,015, issued to me May 3, 1927, for rendering the power raising means inactive when the top of the pack attains a predetermined level, controlled by movement of a vertically movable follower, which forms no part of the blank separating means, such movement being produced by contact of said follower with the top of the pack when approaching the designed upper limit of its movement during which said vertically movable follower rides upon the top of the pack, preferably in close proximity to the point where the blank separating means engages the blanks.

The follower is oscillated vertically by a means provided for the purpose—either manually or by power—independently of stack movement. The follower, after being raised each time above the stack, is increasingly limited in its downward movement by the top of the stack as the top of the stack rises, while upon downward movement of the follower past a predetermined point, this limiting of the follower grows less and less as the level of the pack is lowered—either suddenly by the manually operated means, or gradually as blanks are fed from the top of the pack in operation.

To effect the objects of the invention, the means for rendering the power means for raising the pack carriage inactive, comprises the various features, combinations of features and details of construction hereinafter described and claimed. In the accompanying drawings, in which the invention is fully illustrated:

Fig. 3 is a fragmentary perspective view;

Fig. 4 is a fragmentary sectional view of the machine substantially on the line 4—4 of Fig. 2; and Fig. 5 is a fragmentary top plan view substantially from the position 5—5 of Fig. 4.

Figure 1:
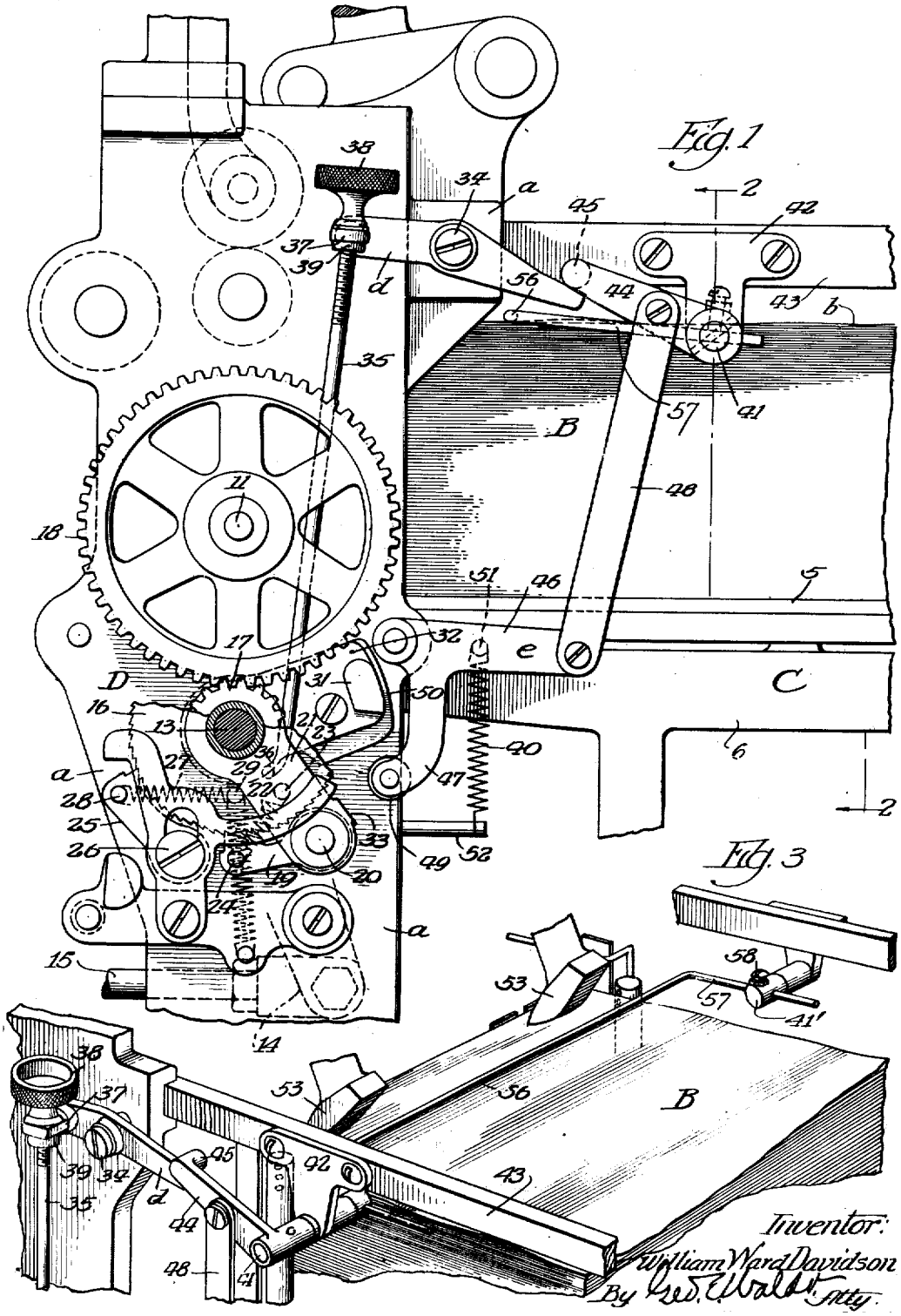
Fig. 1 is a fragmentary elevation of the right side of a blank separating machine embodying my invention and improvements, as viewed from the left side of said figure.
Figure 2:
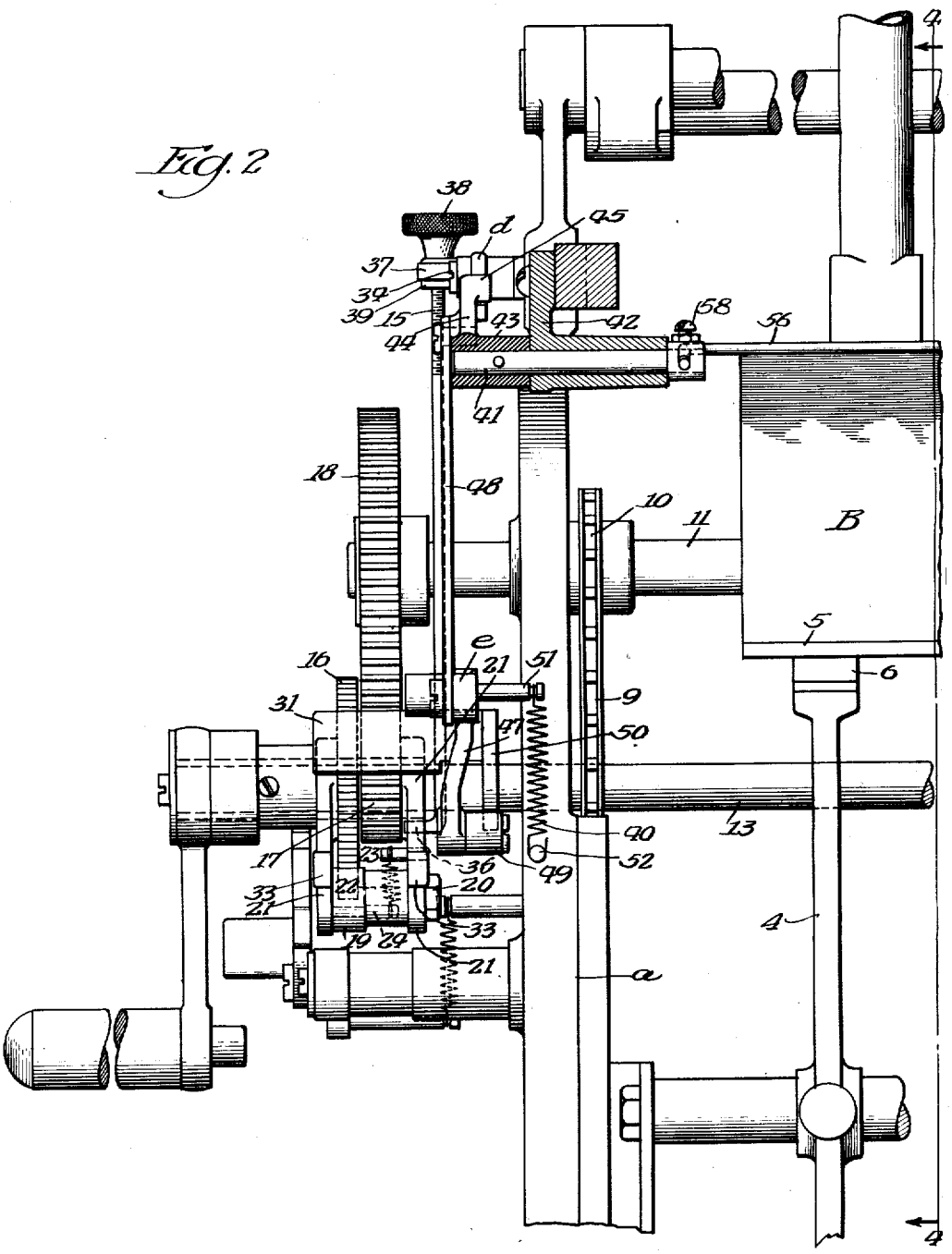
Fig. 2 is a fragmentary view, partly in section, from the position indicated by the line 2—2 of Fig. 1, on which, also, the section is taken.

As regards the means for separating the blanks from a pack of blanks supported on the carriage, the machine shown in the drawings is a usual type of suction feeder, of which there are several different makes which may be purchased commercially, and which will be readily understood by persons familiar with such feeders from an examination of the drawings, without a description thereof in detail.

Accordingly, as the invention of the present application relates only to the means for actuating and controlling movement of the pack carriage, parts and features of the machine not germane to the present invention, have been, for the most part, entirely omitted or, if shown at all, are shown diagrammatically, thus avoiding confusion and unnecessary description and rendering the description of the invention covered by the application clear and definite.

Describing my invention with particular reference to the drawings, *a* designates one of the side frames of the machine.

The pack of blanks to be separated and fed, designated B, and the top of which is indicated by the line *b*, Fig. 1, is supported upon a carriage, designated as a whole C, comprising side frame members, one of which is shown at *c* Fig. 4, and which are rigidly connected by transverse rods, 1, 2 and 3, and brackets 4 supported on the rods 1 and 3 so as to be adjustable towards and from each other, and which are adapted to be secured in adjusted positions on said rods by set screws threaded through bosses on said brackets in line with the supporting rod 1.

The pack of blanks B rests directly upon a board 5, which is preferably removable, and which, in use, is supported on arms 6 forming parts of the brackets 4, the plane of the top sides of said bracket arms and the board 5 being substantially horizontal, whereby the pack of blanks will be supported flatwise and in substantially horizontal position.

The pack carriage C is bodily movable vertically, being confined and guided in its vertical movement by engagement of rigid parts thereof with guide bearings on the side frame members *a*. In the preferable construction shown, see Fig. 4, vertically spaced roller studs 7 project from the outer sides of the pack carriage C and engage guide grooves 8 formed in the adjacent sides of said frame members *a*.

The pack carriage C is supported by means of chain belts 9 connected thereto and which pass over sprocket wheels 10 secured to a shaft 11 rotatably mounted in bearings in the side frame members *a*. The free ends of said chain belts hang free and weights 12 are preferably suspended therefrom, adapted to prevent jumping of said chain belts, which would cause disengagement thereof from the teeth of the sprocket wheels 10.

The pack carriage C is adapted to be raised both manually and by power, but can be lowered manually only.

As shown, see particularly Fig. 1, the power means for raising said pack supporting carriage is as follows: Rotatably mounted in bearings in the frame members *a* of the machine is a shaft 13 to which oscillating movement is imparted in operation by a lever arm 14 secured thereto, said lever arm being connected by a rod 15 with a driven part of the machine to which said blank separating and feed machine is applied in use. Also, to provide for stopping the separating and feeding mechanism without stopping the machine to which it is applied, said lever arm 14 preferably is mounted on the rock shaft 13 so as to turn thereon and is adapted to be secured thereto and disconnected therefrom by means of a suitable clutch. However, said clutch forms no part of my present invention and need not, therefore, be either shown or described herein.

The power means for driving the shaft 11 also comprises a ratchet gear, designated as a whole D, so constructed and arranged that oscillation of the shaft 13 will impart step-by-step rotation to said shaft 11 in a direction to raise the pack carriage C. As shown, said ratchet gear comprises a ratchet wheel 16 mounted to turn on the shaft 13, secured to rotate with which is a pinion 17 which meshes with a gear 18 secured to the shaft 11. Step-by-step rotation is adapted to be imparted to the ratchet wheel 16 by the thrust or throw of an actuating pawl 19 pivoted to a stud 20 secured in the free end of a frame 21 pivoted to the shaft 13.

Said pawl 19 is maintained yieldingly in engagement with the teeth of the ratchet wheel 16 by a spring 22, opposite ends of which are connected to pins 23 and 24, secured in said pawl and in the pawl carrying frame 21, respectively.

As shown, the ratchet wheel 16 is prevented from turning backwards—which would lower the pack carriage C—by a retaining pawl 25 pivoted to a stud 26 secured in the frame member *a* on which the ratchet gear D is mounted. The retaining pawl 25 is maintained yieldingly in engagement with the teeth of the ratchet wheel 16 by a spring 27, opposite ends of which are attached to pins 28 and 29 secured, respectively, in the outer end of said retaining pawl and in the frame member *a* of the machine.

In the operation of the machine, actuating pawl 19 is adapted to be advanced to impart step-by-step rotation to the ratchet wheel 16 by a tappet 31 formed on and which projects laterally from an arm 32 secured to the shaft 13 so as to turn or oscillate therewith, said tappet 31 being adapted to strike surfaces 33 formed on the pawl carrying frame 21 to which the actuating pawl is pivoted, as said arm 32 oscillates with the shaft 13.

When free to respond thereto, the pawl-carrying frame 21—together with the pawl 19 mounted thereon—is adapted to be maintained yieldingly at the advance limit of its throw and to be moved to take a new purchase upon the ratchet at each feeding cycle, after which forward movement of the tappet 31 on the oscillating rock arm 32 against the surfaces 33 on said pawl-carrying frame moves the ratchet rotated by the pawl to the pawl's advance limit as follows: Pivoted to the frame member *a* at 34 is a lever *d*, one end of which is connected with said pawl-carrying frame by a rod 35. As shown, said rod is pivotally connected to both said lever and frame, the means for connecting said rod to the lever *d* preferably being constructed and arranged for adjusting the operative length of said rod. As shown said rod 35 has a hook 36 on its lower end fitted to turn in a bearing in the frame 21, and the upper end of said rod extends through a hole formed in a stud 37 pivotally mounted in a bearing on the lever *d*.

To provide for varying the operative length of said rod 35, its upper end is screw-threaded and nuts 38 and 39 are adjusted thereto on opposite sides of the stud 37, the sides of which against which said nuts bear being flattened, as shown. For convenience, the nut 38 is preferably a thumb nut.

The pawl 19 and frame 21 are yieldingly held at the limit of their throw by the weight of the frame 21 and rod 35 and the tension of the spring 22 holding the pawl against any particular tooth in the ratchet wheel 16. This relationship of the parts is overcome and the pawl moved to take a new purchase when the lever *d* is actuated clockwise as viewed in Fig. 1.

Clockwise actuation of the lever *d* is accomplished in the following manner: Secured to a trunnion 41 rotatably mounted in a bearing formed in a bracket 42 secured to a bar 43 supported in fixed position on the machine frame, is a lever arm 44 formed on the free end of which is a lateral projection 45 which is adapted to rest on the end of the arm of the lever *d* remote from the stud 37 and pivoted to the frame member *a* of the machine adjacent the rock arm 32 is a bell-crank-lever *e*, comprising arms 46 and 47, the arm 46 thereof being connected to the lever arm 44 by a link 48, and a roller 49 being rotatably mounted on the arm 47 thereof in position to project into the path of movement of a cam 50 secured to and which oscillates with the rock arm 32. As shown, opposite ends of the spring 40 are attached to pins 51 and 52 secured, respectively, in the arm 46 of said bell-crank-lever and in the frame member *a*.

With the described construction, it is obvious that except as prevented and controlled by the cam 50 and the top of the stack, the tension of the spring 40, acting through its described connections will move the lever arm 44 to turn the lever *d* in a direction to move the pawl-carrying frame 21 to take a new purchase, after which, upon advancement of the rock arm 32 from its retracted position shown in Fig. 1, the tappet 31 on said rock arm, by contact with the surfaces 33 on said pawl-carrying frame will operate to advance said frame and, through engagement of the pawl 18 with the teeth of the ratchet wheel 16, will turn the shaft 13 in a direction to raise the pack carriage C.

In the operation of the machine, blanks supported upon the pack carriage C are adapted to be withdrawn from the top of the pack one at a time, when the top of the pack is substantially at the level indicated by the line *b*, by means of suction feet, one of which is indicated diagrammatically at 53, Figs. 3 and 4, to which, in operation, oscillating movement is imparted from the position indicated in full lines—in which it will engage the top blank of the pack B—to the position shown in dotted lines—in which the separated blank is raised and advanced between the feed or pull-out rolls 54 and 55, rotation being imparted to said rolls in a direction to withdraw blanks delivered to them by said suction feet by suitable means, usually by operating connection with a driven part of the machine to which the feeder is applied.

Per se, said blank separating means forms no part of the present invention and, as suction devices suitable for the purpose and actuating means therefor and other details of the installation, are well known and can readily be supplied by skilled mechanics, they are not, therefore, either shown or described in detail.

To effect the object of the invention as it relates to rendering the power means for raising the pack carriage inactive when the top of the pack B attains a predetermined level—preferably the level at which the blank separating means will operate most effectively, indicated approximately by the line *b*, Figs. 1 and 4—my improved feeder comprises means for increasingly limiting turning movement of the lever *d* by the spring 40, as the level of the pack B approaches said predetermined level, thus correspondingly limiting the purchase of the pawl-carrying frame 21, and thus of the pawl 19, the relation being such that when said predetermined level is attained, movement of said pawl will be less than the pitch of the teeth of the ratchet wheel 16, thus causing said pawl to "idle" until the top of a pack again falls below the level of the line *b*, either by lowering the pack carriage bodily by hand, or by feeding blanks from the top of the pack in the regular operation of the feeder.

In the preferable construction shown, the means for thus determining pivotal movement of the lever *d* consists of a member or follower 56, supported above the pack carriage C in position to contact with the pack supporting surface thereof or with the top of a pack of blanks supported thereon, preferably as closely adjacent as practicable to the point at which the suction foot 53 engages the topmost blank of the pack supported on said pack carriage. As shown, said follower 56 consists of a rod or bar which extends transversely across the machine above the pack carriage in the relation specified, said follower being supported at the ends of arms 57, one secured to the trunnion 41 and the other to a corresponding trunnion 41' similarly mounted at the opposite side of the machine, as best shown in Figs. 3 and 5.

As shown, the bar 56 and the supporting arms 57 are formed from an integral piece of wire of a size to provide adequate strength, the ends of which are bent substantially at right angles, said bent over ends being inserted through holes formed in the inner ends of the trunnions 41, 41' and secured therein by set screws 58, the relation being such that said follower 56 will contact with the top of the pack B in desired proximity to the suction feet 53 at the point at which they engage the topmost blank of the pack.

The normal position of the control bar or follower 56 is considerably below the predetermined level indicated by the line *b* at which the pawl 19 will become inactive, said follower being maintained yieldingly in such normal position by the tension of the spring 40, and its position of extreme depression being defined by contact of the roller 49 on the bell-crank lever *e* with the cam 50.

With the described construction, it is obvious that the raising movement of the pack carriage after the pack supporting surface thereof or the top of a pack of blanks supported thereon, contacts with the follower 56, will operate to raise the dropping limit of said follower, which, in turn, through its supporting arms 57, will operate to turn the trunnions 41, 41' less and less and will inhibit the lever 44 to lessen the driving power of lever 44 upon lever *d* so that lever *d* will proportionately move the pawl to assume a new position of correct purchase. The described movement of said follower 56 and of the parts actuated thereby—either directly or indirectly—continue until movement of the pawl-carrying frame 21 is less than the pitch of the teeth of the ratchet wheel 16, which, as heretofore explained will render the actuating pawl 19 inactive and will prevent further raising movement of the pack carriage by the power raising means.

Obviously, such raising movement of the follower 56 will also operate to turn the bell-crank lever *e* pivotally to retract the roller 49 mounted thereon from the face of the cam 50, the relation being such, however, that said roller will be positioned in the path of movement of the operating face of said cam as the lever arm 32 advances on its operating stroke, and will turn the bell-crank lever *e* pivotally in a direction to raise said follower 56 from contact with the top of the pack B, thus eliminating all resistance to withdrawal of blanks from said pack due to the pressure of said follower 56 produced by the spring 40. Preferably, said cam will be timed so that said follower 56 will be entirely above and clear of the blanks as they are raised by the initial raising action of the suction feet 53 in the feeding operation. This is particularly important in the case of blanks of such stiffness that if held down by the pressure of said member, there would be danger of breaking the suction which holds them in engagement with said suction feet 53, which, at each occurrence, would result in failure to feed a blank.

Raising of the follower 56 as blanks are withdrawn, is also important for the reason that thereby all frictional resistance to withdrawal of blanks, due to the pressure of said follower, is eliminated, thus further insuring against failure to feed.

An important advantage arising from the intermittent pressure imposed on the pack of blanks B by oscillation of the follower 56, as described is that it produces a flow of air admitted between the uppermost blanks of the pack away from said follower as it is depressed, which will tend to break adhesions between said blanks and will further insure against failure to feed and "double" feeding.

What is claimed is:

1. In a blank separating machine of the class described having a vertically movable pack carriage, a vertically movable follower supported above the carriage and normally urged to contact the feed end of the stack, an oscillating member, a ratchet and a pivoted pawl-carrying frame moved by the oscillating member to the end limit of its throw for raising the carriage towards the follower, the pawl being normally positioned at said limit, means operated by the follower when the follower moves towards the stack for moving the pawl-carrying frame from its normal position a distance proportional to the distance the follower travels below a predetermined point, and means actuated by the oscillating member upon the first part of its stroke for lifting the follower from contact with the stack to release the top blank and for releasing said pawl moving means.

2. In a blank separating machine of the class described having a vertically movable pack carriage, a vertically movable follower moved normally to contact the feed end of the stack, an oscillating member, a ratchet and a pawl-carrying frame actuated by the oscillating member to advance the pawl to the limit of its throw for moving the carriage towards the follower, the pawl being normally positioned at said limit, a rotatable member supporting the follower above the carriage, a lever arm secured to the rotatable member, means actuated by the oscillating member for oscillating the lever arm to raise and lower the follower, a pivoted lever actuated by the lever arm said pawl-carrying frame being driven by the pivoted lever to move the pawl from its normal position upon the downward movement of the follower with increasingly limited movement as the top of the stack rises.

3. In a blank separating machine of the class described having a vertically movable pack carriage, a rotatable member and a supporting arm at each side of the machine, a vertically movable follower supported above the carriage by said supporting arms and normally urged to contact the feed end of the stack at a plurality of points throughout the width of the carriage, an oscillating member, a ratchet and a pawl-carrying frame actuated by the oscillating member to advance the pawl to the limit of its throw for moving the carriage towards the follower, the pawl being normally positioned at said limit, a lever secured to one of said rotatable members, means actuated by the oscillating member for oscillating the lever arm to raise and lower the follower, a pivoted lever actuated by the lever arm, a connection between the pivoted lever and the pawl-carrying frame to move the pawl from its normal position upon the downward movement of the follower with increasingly limited movement when the top of the stack rises.

4. In a blank separating machine of the class described having a vertically movable pack carriage, a vertically movable follower moved normally to contact the feed end of the stack, an oscillating member, a ratchet and a pawl-carrying frame actuated by the oscillating element to move the pawl to the limit of its throw for raising the carriage towards the follower the pawl being normally positioned at said limit, a rotatable member supporting the follower above the carriage, a lever arm secured to the rotatable member, means actuated by the oscillating member for oscillating the lever arm to raise and lower the follower, a pivoted lever actuated by the lever arm, a connection between the pivoted lever and the pawl-carrying frame to move the pawl from its normal position upon the downward movement of the follower with increasingly limited movement as the top of the stack rises, and means for varying the operative length of the connection between the pivoted lever and the pawl-carrying frame.

5. In a blank separating machine of the class described having a vertically movable pack carriage, a vertically movable follower moved normally to contact the feed end of the stack, an oscillating member, a ratchet and a pawl-carrying frame actuated by the oscillating element to move the pawl to the limit of its throw for raising the carriage towards the follower, the pawl being normally positioned at said limit, a rotatable member supporting the follower above the carriage, a lever arm secured to the rotatable member, means actuated by the oscillating member for oscillating the lever arm to raise and lower the follower, a pivoted lever actuated by the lever arm, a rod pivoted to the pawl-carrying frame, a stud pivoted to said pivoted lever provided with a hole through which the rod extends, nuts threaded to said rod at opposite sides of said stud and between which said stud is clamped, said rod and stud assembly moving the pawl from its normal position upon the downward movement of the follower with increasingly limited movement as the top of the stack rises.

6. In a blank separating machine of the class described having a vertically movable pack carriage, a vertically movable follower moved normally to contact the feed end of the stack, an oscillating member, a ratchet and a pawl-carrying frame actuated by the oscillating member to move the pawl to the limit of its throw for raising the carriage towards the follower, the pawl being normally positioned at said limit, a rotatable member supporting the follower above the carriage, a lever arm secured to the rotatable member, means actuated by the oscillating member for raising the follower above the top of the pack during withdrawal of blanks therefrom and to lower the follower against the pack, a pivoted lever actuated by the lever arm and driving the pawl-carrying frame to move the pawl from its normal position upon the downward movement of the follower with increasingly limited movement as the top of the stack rises.

7. In a blank separating machine of the class described having a vertically movable pack carriage, a vertically movable follower moved normally to contact the feed end of the stack, an oscillating member, a ratchet and a pawl-carrying frame actuated by the oscillating element to move the pawl to the limit of its throw for raising the carriage towards the follower, the pawl being normally positioned at said limit, a rotatable member supporting the follower above the carriage, a lever arm secured to the rotatable member, a pivoted bell-crank lever, a cam carried by the oscillating member for advancing the pawl-carrying frame and arranged to engage one end of the bell-crank lever, a link connecting the other arm of the bell-crank lever with the lever arm on the rotatable member for raising the follower above the top of the pack during withdrawal of blanks therefrom, a pivoted lever actuated by the lever arm, means carried by the pivoted lever for moving the pawl-carrying frame in a direction opposite to its throw, a spring applied to the bell-crank lever to oppose the action of the cam, the relation being such that when the lever arm is lowered by the spring upon the release of the cam the lever arm will actuate the pivoted lever to move the pawl-carrying frame towards the oscillating member a distance corresponding to the distance the follower moves past a predetermined point upon its downward movement.

8. In a blank separating machine of the class described having a vertically movable pack carriage, a vertically movable follower moved normally to contact the feed end of the stack, an oscillating member, a ratchet and a pawl-carrying frame actuated by the oscillating element to move the pawl to the limit of its throw for raising the carriage towards the follower, a rotatable member supporting the follower above the carriage, a lever arm secured to the rotatable member, a pivoted bell-crank lever, a cam carried by the oscillating member for advancing the pawl-carrying frame and arranged to engage one end of the bell-crank lever, a link connecting the other arm of the bell-crank lever with the lever arm on the rotatable member for raising the follower above the top of the pack during withdrawal of blanks therefrom, a pivoted lever actuated by the lever arm, means carried by the pivoted lever for moving the pawl-carrying frame in a direction opposite its throw, a spring applied to the bell-crank lever to oppose the action of the cam, the relation being such that when the lever arm is lowered by the spring upon the release of the cam the lever arm will actuate the pivoted lever to move the pawl-carrying frame towards the oscillating member a distance corresponding to the distance the follower moves past a predetermined point upon its downward movement, said spring providing the motive force by which the lever arm actuates the pivoted lever.

9. In a blank separating machine of the class described having a vertically movable pack carriage, a vertically movable follower supported above the carriage and normally urged to contact with the feed end of the stack, an oscillating member, a ratchet and a pivoted pawl-carrying frame moved by the oscillating member to the end limit of its throw for raising the carriage towards the follower, the pawl being normally positioned at said limit, means positively driven by the follower when the follower moves towards the stack for driving the pawl-carrying frame from its normal position in relation to the degree of throw of the follower, and means actuated by the oscillating member upon the first part of its stroke for lifting the follower from contact with the stack independently of the pawl movement to release the top blank and for releasing said positive drive relation to enable the return of said frame to its end limit by said oscillating means.

10. In a blank separating machine of the class described having a vertically movable pack carriage, a vertically movable follower arm supported above the carriage, spring means normally urging the follower arm into contact with the feed end of the stack, an oscillating member, a ratchet and a pivoted pawl-carrying frame moved by the oscillating member to the terminal limit of its throw for raising the carriage towards the follower arm, the pawl being normally positioned at said limit, a pawl control lever for moving the pawl-carrying frame from its normal position, a drive engagement between the follower arm and the pawl control lever by which the follower arm by the pressure of the spring means drives the pawl control lever on its downward movement with an increasingly limited movement as the top of the stack rises, and means actuated by the oscillating member upon the first part of its stroke for lifting the follower from contact with the stack to release the top blank and for releasing said pawl moving member.

11. In a blank separating machine of the class described having a vertically movable pack carriage, a vertically movable follower extending across the top of the pack and moved normally towards the stack, an oscillating member, a ratchet and a pawl-carrying frame the start of whose throw is within the throw of the oscillating member, the throw of the pawl moving the carriage towards the follower and the pawl being normally positioned at the end limit of its throw, a rotatable means driven by the follower, means actuated by the oscillating member to raise and lower the follower, a pivoted lever actuated by the rotatable means, a connection between the pivoted lever and the pawl-carrying frame to move the pawl from its normal position upon the downward movement of the follower with increasingly limited movement as the top of the stack rises.

12. In a blank separating machine of the class described having a vertically movable pack carriage, a vertically movable follower supported above the carriage, means normally urging the follower towards the stack, an oscillating member, a ratchet and a pivoted pawl-carrying frame moved by the oscillating member to the end limit of its throw for raising the carriage towards the follower, the pawl being normally positioned at said limit, a pawl control lever for moving the pawl-carrying frame from its normal position, means actuated by the oscillating member for raising the follower above the top of the pack during withdrawal of blanks therefrom and to lower the follower against the pack preliminary to the next withdrawal to contact the top of the pack and the pawl control lever for moving the control lever to a point comparable to the height of the stack, said means releasing said pawl moving member upon the upward movement of the follower.

13. In a blank separating machine of the class described having a vertically movable pack carriage, a pack follower extending across the pack and supported above the carriage upon both sides of the machine, spring means normally urging the follower into contact with the stack, an oscillating member, a ratchet, a pivoted pawl-carrying frame moved by the oscillating member to the end limit of its throw for actuating the ratchet to move the carriage towards the follower, the pawl being normally positioned at said limit, means for moving the pawl-carrying frame from its normal position, means actuated by the oscillating member for raising and permitting the follower to lower, and means engaged by the actuated means to move the pawl to the beginning of its throw when the follower is lowered and to release the pawl when raised, said follower releasing the top blank for withdrawal when raised.

14. In a blank separating machine of the class described having a vertically movable pack carriage, a vertically movable follower moved normally to contact the feed end of the stack, an oscillating member, a ratchet and a pawl-carrying frame actuated by the oscillating member to advance the pawl to the limit of its throw for moving the carriage towards the follower, the pawl being normally positioned at said limit, a rotatable member supporting the follower above the carriage, a lever arm secured to the rotatable member, means actuated by the oscillating member for oscillating the lever arm to raise and lower the follower, a pivoted lever, a driving engagement between the pivoted lever and the lever arm by which the pivoted lever is actuated upon downward movement of the lever arm, a drive connection between the pivoted lever and the pawl-carrying frame to move the pawl from its normal position upon the downward movement of the follower with increasingly limited movement as the top of the stack rises.

15. In a blank separating machine of the class described having a vertically movable pack carriage, a pack follower extending across the pack and supported above the carriage upon both sides of the machine, spring means normally urging the follower into contact with the stack, an oscillating member, a ratchet, a pivoted pawl-carrying frame moved by the oscillating member to the end limit of its throw for actuating the ratchet to move the carriage towards the follower, the pawl being normally positioned at said limit, means for moving the pawl-carrying frame from its normal position under the pressure of said spring means, means actuated by the oscillating member for raising the follower above the said level of the stack and permitting the follower to fall, and means engaged by the actuated means to move the pawl to the beginning of its throw when the follower falls and to release the pawl when raised, said follower releasing the top blank for withdrawal when raised.

16. In a blank separating machine of the class described having a vertically movable pack carriage, a follower supported above the carriage, means urging the follower towards the stack, an oscillating member, a ratchet, a pivoted pawl-carrying frame moved by the oscillating member through its throw for actuating the ratchet to raise the carriage towards the follower, the pawl being normally positioned where the oscillating member leaves it, means drivingly operated by the follower when the follower is lowered for moving the pawl-carrying frame from its normal position, and means actuated by the oscillating member upon the first part of its stroke for lifting the follower from contact with the stack to release the top blank and for freeing said pawl moving means from the control of the follower.

17. In a blank separating machine of the class described having a vertically movable pack carriage, a follower supported above the carriage and means normally urging the follower into contact with the stack, an oscillating member, a ratchet, a pivotally mounted pawl moved by a one way drive engagement with the oscillating member to the end of its throw for raising the carriage towards the follower, the pawl resting in the position imposed upon it by the oscillating member, means having a one way engagement with the follower when the follower moves towards the stack for positively driving the pawl from its normal position, and means actuated by the oscillating member for lifting the follower from contact with the stack to release the top blank.

18. In a blank separating machine of the class described having a vertically movable pack carriage, a vertically movable follower supported to be located above the carriage and normally urged to contact the top of the stack, an oscillating member, a ratchet and a pivoted pawl-carrying frame moved by the oscillating member to the end limit of its throw for raising the carriage towards the follower, the pawl being normally positioned at said limit, means positively driven with the direct drive by the follower when the follower moves towards the stack for moving the pawl-carrying frame from its normal position, and means actuated by the oscillating member upon the first part of its stroke for lifting the follower from contact with the stack to release the top blank and for freeing said pawl-moving means from the direct drive to permit said oscillating member to move the pawl-carrying frame again to said end limit of its throw.

19. In a blank separating machine of the class described having a vertically moving pack carriage, a vertically movable follower supported above the carriage, and normally urged to contact the feed end of the stack, an oscillating member, a ratchet and a pivoted pawl-carrying frame moved by the oscillating member to the end limit of its throw for raising the carriage towards the follower, the pawl being normally positioned at said end limit, means positively driven by the follower when the follower moves toward the stack and adjustable to vary the action of the follower upon said means as regards the level of the stack at which the follower is effective to drive said driven means for moving the pawl-carrying frame from its normal position within the throw of said oscillating member a distance in proportion to the distance the follower has to travel below a predetermined point.

20. In a blank separating machine of the class described having a vertically movable pack carriage, a rotatable member and a supporting arm at each side of the machine supported for pivotal movement about an axis parallel and transverse to the pack carriage, a vertically movable follower supported above the carriage by said supporting arms for movement about said axis and normally urged to contact the feed end of the stack at any one of a plurality of points, an oscillating member, a ratchet and a pawl-carrying frame actuated by the oscillating member to advance the pawl to the limit of its throw for moving the carriage towards the follower, the pawl being normally positioned at said limit, a lever secured to one of said rotatable members, means actuated by the oscillating member for oscillating the lever arm to raise and lower the follower, a pivoted lever actuated by the lever arm, a connection between the pivoted lever and the pawl-carrying frame to move the pawl from its normal position upon the downward movement of the follower with increasingly limited movement when the top of the stack rises.

WILLIAM WARD DAVIDSON.

CERTIFICATE OF CORRECTION.

Reissue No. 21,707. February 4, 1941.

WILLIAM WARD DAVIDSON.

It is hereby certified that error appears in the printed specification of the above numbered patent requiring correction as follows: Page 6, second column, line 14, claim 18, for the words "with the direct" read --with a direct--; and that the said Letters Patent should be read with this correction therein that the same may conform to the record of the case in the Patent Office.

Signed and sealed this 11th day of March, A. D. 1941.

Henry Van Arsdale,
Acting Commissioner of Patents.

(Seal)